US012131155B2

(12) United States Patent
Sun et al.

(10) Patent No.: US 12,131,155 B2
(45) Date of Patent: Oct. 29, 2024

(54) APPARATUS AND METHOD FOR SPECULATIVELY VECTORISING PROGRAM CODE

(71) Applicants: ARM LIMITED, Cambridge (GB); THE CHANCELLOR, MASTERS AND SCHOLARS OF THE UNIVERSITY OF CAMBRIDGE, Cambridge (GB)

(72) Inventors: Peng Sun, Cambridge (GB); Timothy Martin Jones, Cambridge (GB); Giacomo Gabrielli, Cambridge (GB)

(73) Assignees: Arm Limited, Cambridge (GB); The Chancellor, Masters and Scholars of the University of Cambridge, Cambridge (GB)

( * ) Notice: Subject to any disclaimer, the term of this patent is extended or adjusted under 35 U.S.C. 154(b) by 200 days.

(21) Appl. No.: 17/597,134

(22) PCT Filed: Mar. 25, 2020

(86) PCT No.: PCT/GB2020/050798
§ 371 (c)(1),
(2) Date: Dec. 27, 2021

(87) PCT Pub. No.: WO2021/001641
PCT Pub. Date: Jan. 7, 2021

(65) Prior Publication Data
US 2022/0236990 A1 Jul. 28, 2022

(30) Foreign Application Priority Data
Jul. 1, 2019 (GB) .................................. 1909465

(51) Int. Cl.
*G06F 9/30* (2018.01)
*G06F 9/345* (2018.01)
(Continued)

(52) U.S. Cl.
CPC ........ *G06F 9/30036* (2013.01); *G06F 9/3004* (2013.01); *G06F 9/3555* (2013.01); *G06F 9/3842* (2013.01)

(58) Field of Classification Search
CPC .... G06F 9/3861; G06F 9/30036; G06F 9/345; G06F 9/3842; G06F 9/3555;
(Continued)

(56) References Cited

U.S. PATENT DOCUMENTS

| 7,203,817 B2* | 4/2007 | Yeh ....................... G06F 9/3836 712/216 |
| 8,185,700 B2* | 5/2012 | Gimeno ............... G06F 12/0831 712/216 |

(Continued)

FOREIGN PATENT DOCUMENTS

| GB | 2 519 107 A | 4/2015 |
| GB | 2 549 737 A | 11/2017 |
| GB | 2 554 096 A | 3/2018 |

*Primary Examiner* — Chun Kuan Lee
(74) *Attorney, Agent, or Firm* — NIXON & VANDERHYE P.C.

(57) ABSTRACT

An apparatus and method are provided for speculatively vectorising program code. The apparatus includes processing circuitry for executing program code, the program code including an identified code region comprising at least a plurality of speculative vector memory access instructions. Execution of each speculative vector memory access instruction is employed to perform speculative vectorisation of a series of scalar memory access operations using a plurality of lanes of processing. Tracking storage is used to maintain, for each speculative vector memory access instruction, tracking information providing an indication of a memory address being accessed within each lane. Checking circuitry then references the tracking information during execution of the identified code region by the processing circuitry, in order to detect any inter lane memory hazard (Continued)

resulting from the execution of the plurality of speculative vector memory access instructions.

26 Claims, 10 Drawing Sheets

(51) Int. Cl.
  *G06F 9/355* (2018.01)
  *G06F 9/38* (2018.01)

(58) Field of Classification Search
  CPC .. G06F 9/3004; G06F 9/30076; G06F 9/3834; G06F 9/3838
  USPC .......................................................... 712/7
  See application file for complete search history.

(56) References Cited

U.S. PATENT DOCUMENTS

| | | | |
|---|---|---|---|
| 2008/0288744 A1 | 11/2008 | Gonion et al. | |
| 2008/0288759 A1 | 11/2008 | Gonion et al. | |
| 2011/0161642 A1* | 6/2011 | Eichenberger | G06F 9/3838 712/241 |
| 2014/0281401 A1* | 9/2014 | Hughes | G06F 9/30152 712/210 |
| 2017/0046167 A1* | 2/2017 | Yen | G06F 9/3869 |

\* cited by examiner

OPTION 1: TAG IS SINGLE BIT    SET = CHECK
                               CLEAR = DO NOT PERFORM CHECK

OPTION 2: TAG IS MULTI BIT     ALLOWS VECTOR MEMORY
                               ACCESS INSTRUCTIONS TO BE
                               GROUPED FOR CHECKING

APPARATUS AND METHOD FOR SPECULATIVELY VECTORISING PROGRAM CODE

BACKGROUND

The present technique relates to an apparatus and method for speculatively vectorising program code.

In order to seek to improve performance, vector processing circuitry has been developed, that can enable a plurality of operations to be performed in parallel in a plurality of lanes of processing provided by the vector processing circuitry. In association with such vector processing circuits, vector instruction set architectures (ISAs) have been developed providing new instructions and wider data paths. For example, single instruction, multiple data (SIMD) vector processing circuits include multiple processing elements that can perform the same operation on multiple different sets of data simultaneously, in order to exploit data level parallelism. Thus, a single vector instruction can specify one or more vectors of input data values, with the input data values within each vector being processed within corresponding lanes of parallel processing within the vector processing circuitry, thereby enabling the same operation to be performed in parallel on multiple data values.

Such a technique can significantly improve performance, and can enable a series of scalar operations to be vectorised so that they can be performed in parallel by a corresponding vector operation. However, modern SIMD architectures still rely on the programmer or compiler to transform code to vector form only when it is safe to do so. In practice, limitations in a compiler's memory alias analysis and the presence of infrequent memory data dependencies mean that whole regions of code cannot be safely vectorised in existing systems without risking changing the semantics of the application, thus restricting the available performance improvements that could be realised.

It would be desirable to provide an improved technique that enabled an increase in the scenarios in which code can be vectorised.

SUMMARY

In one example arrangement, there is provided an apparatus comprising: processing circuitry to execute program code, the program code including an identified code region comprising at least a plurality of speculative vector memory access instructions, where execution of each speculative vector memory access instruction is employed to perform speculative vectorisation of a series of scalar memory access operations using a plurality of lanes of processing; tracking storage to maintain, for each speculative vector memory access instruction, tracking information providing an indication of a memory address being accessed within each lane; checking circuitry to reference the tracking information during execution of the identified code region by the processing circuitry, in order to detect any inter lane memory hazard resulting from the execution of the plurality of speculative vector memory access instructions; a status storage element to maintain an indication of each lane for which the checking circuitry determines an inter lane memory hazard of at least a first type; and replay determination circuitry arranged, when an end of the identified code region is reached, to be responsive to the status storage element identifying at least one lane as having an inter lane memory hazard, to trigger re-execution of the identified code region for each lane identified by the status storage element.

In another example arrangement, there is provided a method of speculatively vectorising program code, comprising: employing processing circuitry to execute program code, the program code including an identified code region comprising at least a plurality of speculative vector memory access instructions, where execution of each speculative vector memory access instruction is employed to perform speculative vectorisation of a series of scalar memory access operations using a plurality of lanes of processing; maintaining within tracking storage, for each speculative vector memory access instruction, tracking information providing an indication of a memory address being accessed within each lane; employing checking circuitry to reference the tracking information during execution of the identified code region by the processing circuitry, in order to detect any inter lane memory hazard resulting from the execution of the plurality of speculative vector memory access instructions; maintaining within a status storage element an indication of each lane for which the checking circuitry determines an inter lane memory hazard of at least a first type; and when an end of the identified code region is reached, and the status storage element identifies at least one lane as having an inter lane memory hazard, triggering re-execution of the identified code region for each lane identified by the status storage element.

In a still further example arrangement, there is provided a computer program for controlling a host data processing apparatus to provide an instruction execution environment comprising: processing program logic to execute program code, the program code including an identified code region comprising at least a plurality of speculative vector memory access instructions, where execution of each speculative vector memory access instruction is employed to perform speculative vectorisation of a series of scalar memory access operations using a plurality of lanes of processing; a tracking data structure to maintain, for each speculative vector memory access instruction, tracking information providing an indication of a memory address being accessed within each lane; checking program logic to reference the tracking information during execution of the identified code region by the processing program logic, in order to detect any inter lane memory hazard resulting from the execution of the plurality of speculative vector memory access instructions; a status data structure to maintain an indication of each lane for which the checking program logic determines an inter lane memory hazard of at least a first type; and replay determination program logic arranged, when an end of the identified code region is reached, to be responsive to the status data structure identifying at least one lane as having an inter lane memory hazard, to trigger re-execution of the identified code region for each lane identified by the status data structure.

In a yet further example arrangement, there is provided an apparatus comprising: processing means for executing program code, the program code including an identified code region comprising at least a plurality of speculative vector memory access instructions, where execution of each speculative vector memory access instruction is employed to perform speculative vectorisation of a series of scalar memory access operations using a plurality of lanes of processing; tracking storage means for maintaining, for each speculative vector memory access instruction, tracking information providing an indication of a memory address being accessed within each lane; checking means for referencing the tracking information during execution of the identified code region by the processing means, in order to detect any inter lane memory hazard resulting from the execution of the plurality of speculative vector memory access instructions; a status storage element means for maintaining an indication of each lane for which the checking means determines an inter lane memory hazard of at least a first type; and replay determination means, when an end of the identified code region is reached, for being responsive to the status storage element means identifying at least one lane as having an inter lane memory hazard, to trigger re-execution of the identified code region for each lane identified by the status storage element means.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
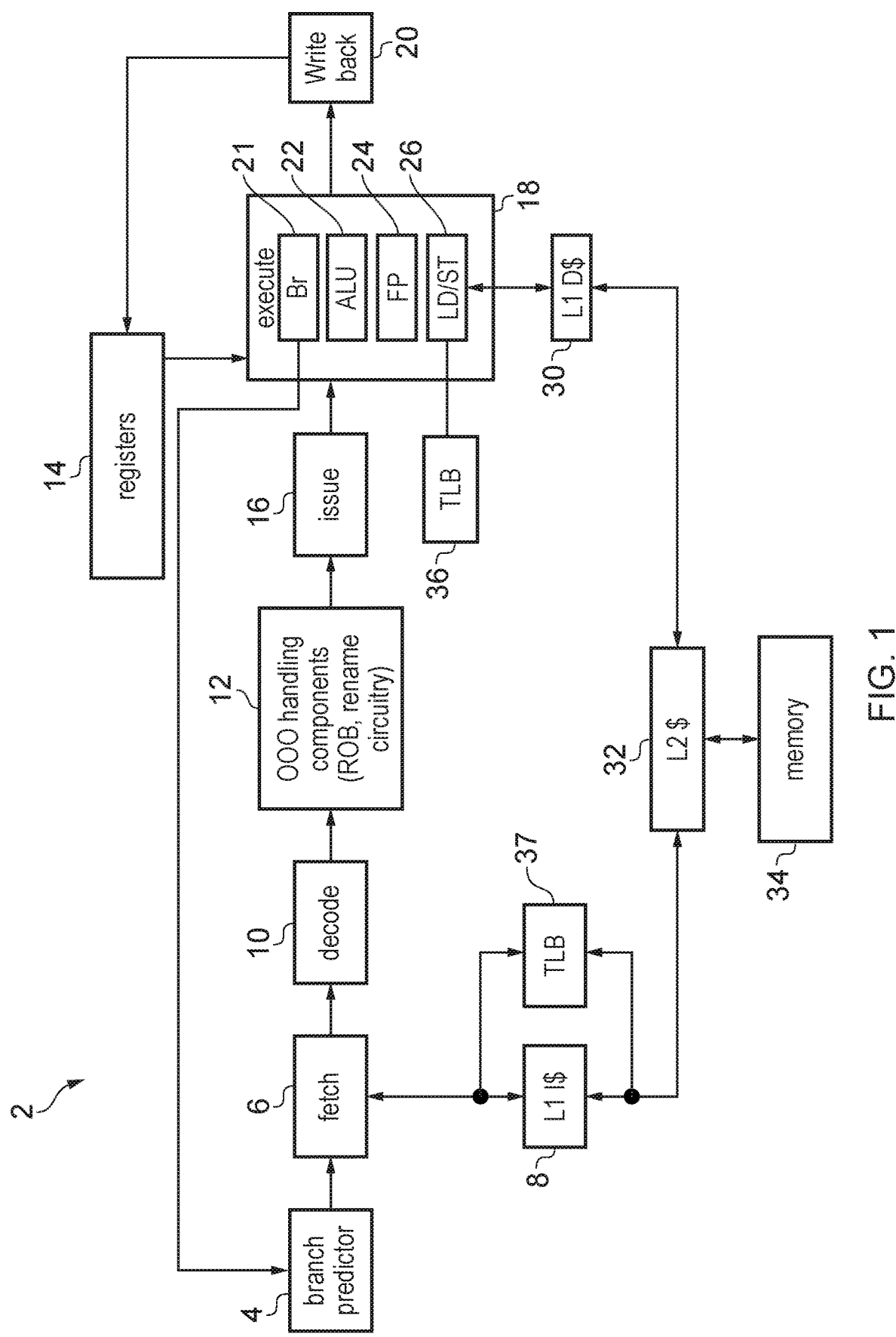
FIG. 1 schematically illustrates a data processing apparatus in accordance with one example.

The techniques described herein concern the vectorisation of scalar memory access operations. When seeking to vectorise such scalar memory access operations so that those operations are performed in parallel in a plurality of lanes of processing, there is the possibility of through-memory dependencies (TMDs) arising, these being dependencies caused by memory aliasing. In particular, a memory aliasing issue can occur when a plurality of such scalar memory access operations are vectorised since the address accessed in one lane for one of the vectorised scalar memory access operations may have a memory aliasing issue with respect to the address accessed in a different lane for another vectorised scalar memory access operation. Purely by way of example, if a scalar load operation is followed by a scalar store operation, and multiple iterations of those load and store operations are vectorised, so that for example a vector load operation is executed followed by a vector store operation, it will be appreciated that each iteration of the original scalar code is represented by a different lane within the vector processing arrangement. This can give rise to a read after write (RAW) inter lane memory hazard in situations where a given address is used in both a higher lane for the speculative vector load instruction and a lower lane for the speculative vector store instruction, since the load operation will obtain the old value at that given address when it should have received the new value.

Often it may not be known at the time vectorisation of the original scalar code is being considered whether such TMDs will materialise, or it may be the case that such TMDs only occur periodically. Typically, prior to the technique described herein, sections of code including such scalar memory access operations would not be vectorised, due to the potential memory aliasing issue. However, in accordance with the techniques described herein, a mechanism is provided that enables speculative vectorisation of such code regions by enabling memory address conflicts to be detected in hardware, and to automatically trigger selective re-execution for only the specific lanes affected.

In particular, an apparatus is provided that has processing circuitry for executing program code, where the program code includes an identified code region comprising at least a plurality of speculative vector memory access instructions. Execution of each speculative vector memory access instruction is employed to perform speculative vectorisation of a series of scalar memory access operations using a plurality of lanes of processing. In particular, the vectorisation is speculative, since the vectorisation can occur in situations where memory hazards are unknown or periodic, without determining, prior to execution, whether any inter lane memory hazard will in fact be introduced by that speculative vectorisation.

The apparatus also has tracking storage to maintain, for each speculative vector memory access instruction, tracking information providing an indication of a memory address accessed within each lane. The tracking storage can be a dedicated storage provided purely to track the speculative vector memory access instructions. However, as will be discussed in more detail later, in some implementations the tracking storage can be formed by augmenting storage structures that already exist within the apparatus for other reasons, and hence in those instances the tracking storage may also maintain information about other instructions being executed. However, of interest to the present technique is how the tracking storage is used to track information in relation to the speculative vector memory access instructions.

The apparatus also has checking circuitry to reference the tracking information during execution of the identified code region by the processing circuitry, in order to detect any inter lane memory hazard resulting from the execution of the plurality of speculative vector memory access instructions. In particular, whilst it may not be known at the time the scalar memory access operations were speculatively vectorised by specifying the speculative vector memory access instructions, a determination of the presence or absence of any inter lane memory hazards can be determined by the checking circuitry at the time of execution of those speculative vector memory access instructions by the processing circuitry, with reference to the tracking information maintained by the tracking storage.

Furthermore, a status storage element is provided in which to maintain an indication of each lane for which the checking circuitry determines an inter lane memory hazard of at least a first type. Whilst the status storage element could be used to maintain an indication of each lane for which the checking circuitry determines any form of inter lane memory hazard, as will be discussed in more detail later in some instances some types of memory hazard can be resolved by other mechanisms, and accordingly information about those inter lane memory hazards may not need to be captured within the status storage element. However, there will be at least one type of inter lane memory hazard for which the status storage element needs to maintain an indication of each lane for which the checking circuitry has determined the presence of that type of inter lane memory hazard.

The apparatus also provides replay determination circuitry that is arranged, when an end of the identified code region is reached, to be responsive to the status storage element identifying at least one lane as having an inter lane memory hazard, to trigger re-execution of the identified code region for each lane identified by the status storage element.

By such an approach, it is possible to safely vectorise scalar memory access operations that may previously not have been vectorised, since during execution the apparatus can detect and track the presence of any inter lane memory hazards resulting from speculatively vectorising such scalar memory access operations. Furthermore, any re-execution of the identified code region can be limited to the affected lanes, thus giving rise to a particularly efficient implementation.

Hence, through use of the above described technique, TMDs can be handled in hardware, thus enabling speculative vectorisation of code regions exhibiting such dependencies, and thus increasing the extent to which scalar operations can be vectorised to thereby realise the performance benefits associated with the use of vector code.

In one example implementation the apparatus further comprises a control storage element to store an inter lane dependency predicate referenced by the processing circuitry when executing the identified code region. On an initial execution of the identified code region, the inter lane dependency predicate may be initialised to identify all lanes as active so that execution of each speculative vector memory access instruction (and indeed any vector instruction in the identified code region) is unconstrained by the inter lane dependency predicate. Thus, during initial execution of the identified code region, execution of each instruction is constrained only by any predicate that may be explicitly specified for that instruction. In particular, it will be appreciated that in some instruction set architectures, the individual instructions may have predicates associated therewith, in order to identify which lanes are active for that particular instruction. In contrast, the inter lane dependency predicate is an implicit predicate, in that it is not visible to the programmer, and hence is not specified in individual instructions. Instead, it is a predicate that is maintained by the hardware in order to control the selective re-execution in specified lanes when determined by the replay determination circuitry discussed above.

In particular, whilst on an initial execution the inter lane dependency predicate will identify all lanes as active, on a re-execution of the identified code region, the inter lane dependency predicate is set to constrain re-execution of the identified code region to the lanes identified in the status storage element. As discussed earlier, the status storage element is used to maintain an indication of each lane in which one or more types of inter lane memory hazard are detected during execution of the program code, and hence the information maintained in that status storage element at the time the identified code region has been executed can be used to identify whether there are any lanes for which the identified code region needs to be re-executed, with the inter lane dependency predicate then being set accordingly.

There are a number of ways in which the identified code region can be identified. For instance, specific instructions could be used to identify that those instructions are within a region that requires checking using the checking circuitry.

However, in one example implementation a start of the identified code region is identified by a speculative vectorisation (SV) start instruction. By using such a specific instruction, there is no need for the instructions themselves within the identified code region to be different variants to instructions used outside of the identified code region, which is beneficial given that instruction encoding space is usually at a premium.

In implementations using such an SV start instruction, the processing circuitry may be responsive to execution of the SV start instruction to record an address indication of a first instruction following the SV start instruction. The replay determination circuitry is then responsive to determining a requirement to re-execute the identified code region to output the address indication of that first instruction in order to cause re-execution to begin from that first instruction. It should be noted that the re-execution does not return to the SV start instruction, but instead returns to the first instruction following the SV start instruction since that is the instruction that initiates the functionality specified within the identified code region, and the SV start instruction is essentially used to annotate the start of that identified code region.

There are a number of ways in which the address indication output via the replay determination circuitry can be utilised. For example, that address indication may be routed back to fetch circuitry within the apparatus, to begin fetching instructions from that address. It may also be necessary to perform flushing of existing instructions within the processing pipeline of the apparatus, so that the next instruction executed after the end of the identified code region is the instruction at the address indication output by the replay determination circuitry.

In one example arrangement, the processing circuitry may be further responsive to execution of the SV start instruction to initialise the earlier-mentioned inter lane dependency predicate, i.e. to identify all lanes as active so that during an initial execution of the identified code region execution of each vector instruction in the identified code region is unconstrained by the inter lane dependency predicate.

There are a number of ways in which the end of the identified code region can be identified. For example, the identified code region may end with a backward branch instruction whose target is the first instruction in the identified code region (i.e. the instruction immediately following the SV start instruction in implementations that make use of such an SV start instruction). In some instances, that branch instruction can be used to identify the end of the identified code region, and cause the replay determination circuitry to determine whether any re-execution of the identified code region for one or more lanes is required. However, in an alternative implementation, an end of the identified code region is identified by a speculative vectorisation (SV) end instruction, i.e. there is a specific instruction used to identify the end of the identified code region. In one such implementation, the processing circuitry is responsive to execution of the SV end instruction to cause the replay determination circuitry to determine whether re-execution of the identified code region is required for any lanes. This can provide a simple and effective mechanism for implementing the selective re-execution of the identified code region for any lanes for which an inter lane memory hazard of at least the first type has been identified.

The speculative vector memory access instructions may be introduced into the program code in a variety of ways. For example, a programmer might directly specify such speculative vector memory access instructions. However, in one example implementation the speculative vector memory access instructions are introduced by a compiler seeking to speculatively vectorise scalar code, and the compiler is arranged to annotate the program code to identify the instructions forming the identified code region (for example by adding the earlier-discussed SV start and SV end instructions). Hence, the mechanism described herein enables the compiler to speculatively vectorise scalar code in situations where it would previously have been considered not possible, due to the inability to evaluate whether memory aliasing issues will arise, or because it is known that such memory aliasing issues will arise periodically, and accordingly it is not safe to vectorise the scalar code. However, since, in accordance with the techniques described herein, the hardware is able to identify such inter lane memory hazards during execution, and selectively re-execute the identified code region for any affected lanes, it is safe for the compiler to speculatively vectorise such scalar code.

The identified code region can take a variety of forms, but in one example implementation forms at least part of a vector loop used to vectorise a scalar loop. It has been found that the techniques described herein can be particularly beneficially employed in relation to the vectorisation of scalar loops.

The tracking information maintained by the tracking storage for each speculative vector memory access instruction can take a variety of forms. In one example implementation, in addition to providing an indication of a memory address being accessed within each lane, the tracking information is arranged to further provide for each speculative vector memory access instruction, a type indication to indicate whether that speculative vector memory access instruction is a speculative vector load instruction to load data from memory, or a speculative vector store instruction to store data to memory. The checking circuitry is then arranged to reference the type indication when determining whether an inter lane memory hazard has been detected. By keeping information about the type of memory access instruction to which the tracking information relates, this enables the checking circuitry to check for a variety of different inter lane memory hazards, for example read after write inter lane memory hazards, write after read inter lane memory hazards, or write after write inter lane memory hazards.

The type indication can also provide additional information if desired. For example, in some implementations the type indication is further arranged to identify whether the speculative vector memory access instruction is performing accesses to contiguous memory addresses or discontiguous memory addresses. This additional information can be useful in interpreting the tracking information provided for a particular speculative vector memory access instruction.

The tracking storage can be organised in a variety of ways, but in one example implementation comprises a plurality of entries, wherein each entry that is associated with a speculative vector memory access instruction is used to store the tracking information for at least a subset of the scalar memory access operations performed by execution of that speculative vector memory access instruction. Whilst in some instances a single entry may be used to store tracking information for all of the scalar memory access operations performed by execution of that speculative vector memory access instruction, it can simplify the lookup procedure within the tracking storage, and or assist in determining and/or resolving inter lane memory hazards, if certain constraints are placed upon the addresses that can be tracked within an individual entry.

In one example arrangement each entry in the tracking storage is constrained to store tracking information for one or more memory addresses that are address-aligned to a given memory block granularity. By constraining the memory addresses that can be tracked within a single entry in this way, this can support CAM-based (Content Addressable Memory based) lookups. In particular, a certain number of least significant bits of the memory address do not need to be considered during the lookup operation, and instead only a comparison of a certain number of most significant bits of an address need to be compared with corresponding most significant bits captured for the entry in order to determine whether that entry relates to the address in question. The size of the given memory block granularity can vary dependent on implementation, but in one example implementation this granularity can be set equal to the width of the data path between the processing circuitry and cache, for example set equal to the width of the level one data cache data path, which may for example be 128 or 256 bits.

When adopting the above described approach, such that only a certain number of most significant bits need to be captured to represent the memory addresses covered by that entry, that address information can be supplemented with extra information describing the specific address range encoded within the entry. This can for example take the form of per-byte valid bits.

For a speculative vector memory access instruction used to perform accesses to contiguous memory addresses, then only a single entry may be required if those contiguous memory addresses are aligned with the above mentioned memory block granularity. However, when the contiguous memory addresses cross multiple address-aligned memory blocks, then more than one entry in the tracking storage may be allocated to store the associated tracking information.

In one example implementation where the addresses tracked by each entry are required to be address-aligned to a given memory block granularity, then in instances where the speculative vector memory access instruction is used to perform accesses to discontiguous memory addresses, a separate entry in the tracking storage may be allocated to store the associated tracking information for each memory address accessed. In the case of load instructions, a vector memory access instruction used to perform accesses to discontiguous memory addresses may be referred to as a gather instruction, as information from multiple discrete addresses are gathered together for storing in a destination vector register. Similarly, when the speculative vector memory access instruction is used to perform write accesses to discontiguous memory addresses, that speculative vector memory access instruction may be referred to as a scatter instruction, since different data elements within a source vector register are output to discontiguous memory addresses within the memory for storage.

In one example implementation, for each memory address identified within an entry in the tracking storage, the tracking information maintained in that entry is arranged to provide lane identification information sufficient to determine the lane to which each memory address relates. When an entry is associated with a series of contiguous accesses, then this information about the lane to which each memory address relates may be derivable directly from the address information, for example with reference to the earlier-mentioned per-byte valid bits. In such a scenario, the vector element size can be taken into account when interpreting the per-byte valid bits, in order to identify which vector elements are associated with the entry. However, for entries relating to the earlier-mentioned scatter/gather accesses, a specific lane identifier may be provided within each entry, which may also be referred to herein as the vector element index. In particular, since the addresses are discontiguous, it cannot be determined from the address information itself which lane a particular address relates to. Hence, by providing a specific lane identifier that is used for such entries, this can enable the memory address associated with any particular lane of a gather/scatter operation to be determined.

In one example implementation, each speculative vector memory access instruction is either a speculative vector load instruction to load data from memory, or a speculative vector store instruction to store data to memory. The plurality of lanes of processing can be viewed as extending from a lowest lane associated with a first scalar memory access operation in the series being speculatively vectorised by the speculative vector memory access instruction, to a highest lane associated with a final scalar memory access operation in the series. The checking circuitry may then be arranged to detect one or more of the following inter lane memory hazards: a read after write (RAW) inter lane memory hazard where a given address is used in both a higher lane for a speculative vector load instruction and a lower lane for a speculative vector store instruction that appears after the speculative vector load instruction in original program order; a write after read (WAR) inter lane memory hazard where a given address is used in both a higher lane for a speculative vector store instruction and a lower lane for a speculative vector load instruction that appears after the speculative vector store instruction in original program order; a write after write (WAW) inter lane memory hazard where a given address is used in both a higher lane for a first speculative vector store instruction and a lower lane for a second speculative vector store instruction.

It should be noted that the above inter lane memory hazards are different to the types of hazards that might typically be identified by out-of-order handling components provided in an out-of-order processing system. In particular, when instructions can be reordered, there is a possibility that the reordering of the instructions themselves can give rise to memory hazards in any particular lane of processing. These can be viewed as being vertical memory hazards, because they are identified within a particular lane of processing common to the instructions being reordered (i.e. the hazard occurs due to the same address being used in lane x of one instruction and the same lane x of the other instruction). However, the above type of inter lane memory hazards can occur irrespective of whether instructions are reordered or not. In particular, they occur due to the temporal meaning associated with each of the lanes of processing when a series of scalar memory access operations are vectorised.

In particular, each lane is associated with a different iteration of the scalar memory access operations, and the memory hazards do not occur due to use of a conflicting address within a single lane, but due to such an address being used in different lanes across multiple speculative memory access instructions. Hence, even if two speculative vector memory access instructions are executed in original program order, and hence there are no memory hazards introduced by reordering of those instructions, it is still possible for inter lane memory hazards to occur due to the fact that the underlying scalar memory access operations will be reordered by the speculative vectorisation of those scalar memory access operations. To distinguish from the earlier discussed usual memory hazards that may be checked for when reordering instructions (which as discussed earlier may be referred to as vertical memory hazards), the above described inter lane memory hazards may be referred to herein as horizontal memory hazards, since they are hazards that occur between different lanes across multiple speculative vector memory access instructions.

In one example implementation, the apparatus further comprises a store buffer to temporarily store write data generated by execution of each speculative vector store instruction, wherein the write data for a given speculative vector store instruction is inhibited from being output from the store buffer to memory until any inter lane memory hazard resulting from the execution of the given speculative vector store instruction has been resolved.

In implementations that provide such a store buffer, then when the checking circuitry detects presence of a WAR inter lane memory hazard, the checking circuitry may be arranged to resolve the WAR inter lane memory hazard by causing the processing circuitry, when executing the speculative vector load instruction, to retrieve from memory, instead of from the store buffer, the data for the given address associated with the lower lane. The status storage element is then not updated in response to identified WAR inter lane memory hazards. In particular, when a WAR inter lane memory hazard occurs, this is due to the fact that a given address is used in both a higher lane for a speculative vector store instruction and a lower lane for a speculative vector load instruction appearing later in program order than the speculative vector store instruction. However, when considering the underlying series of scalar memory access operations that have been speculatively vectorised by these two vector store and vector load instructions, the relevant load operation may receive the new value at the given address, when the underlying intention of the scalar memory access operations was that it would receive the old version.

However, since the new write data is temporarily buffered in the store buffer, it is still possible to obtain the correct data for the load instruction from memory, and hence by retrieving the data from memory, instead of from the store buffer, the WAR inter lane memory hazard can effectively be resolved without any need to re-execute the identified code region for the lane in question. Hence, there is no need for the status storage element to be updated in response to an identified WAR inter lane memory hazard.

In one example implementation, the status storage element is updated in response to at least each RAW inter lane memory hazard detected by the checking circuitry, and the lane identified in the status storage element is the higher lane for the speculative vector load instruction. In particular, that higher lane for the speculative vector load instruction will obtain the old value at the given address, whereas the intention of the underlying series of scalar memory access operations was that it would retrieve the new value. Hence, the lane to be identified in the status storage element is the higher lane for the speculative vector load instruction, and it will be in connection with that lane that the replay determination circuitry will later trigger re-execution of the identified code region.

In one example implementation, the status storage element is further updated in response to each WAW inter lane memory hazard detected by the checking circuitry, and the lane identified in the status storage element is the higher lane for the first speculative vector store instruction. In particular, in the presence of the WAW inter lane memory hazard, the given memory address will not be updated to reflect the latest version of the data as intended by the underlying series of scalar memory access operations. However, by identifying in the status storage element the lane that is the higher lane for the first speculative vector store instruction, then the identified code region can be re-executed for that lane, which will result in the correct write data then being written to memory.

However, in an alternative implementation, it may be possible to resolve the WAW inter lane memory hazard without needing to re-execute the identified code region. In particular, in one example implementation, when the checking circuitry detects presence of a WAW inter lane memory hazard, the checking circuitry is arranged to resolve the WAW inter lane memory hazard by causing the store buffer to be marked such that the write data produced in the lower lane during execution of the second speculative vector store instruction is inhibited from being output to memory. The status storage element is then not updated in response to identified WAW inter lane memory hazards. Hence, by appropriate marking of the data in the store buffer, the output of the incorrect write data to memory can be suppressed by the store buffer, such that the memory contents end up being as intended by the underlying series of scalar memory access operations. As a result, there is no need to update the status storage element for identified WAW inter lane memory hazards in such an implementation.

The techniques described herein can be utilised in both in order systems and out-of-order systems. However, in one example implementation the processing circuitry is arranged to perform out-of-order (OOO) processing of instructions. In such instances the apparatus will comprise at least one OOO tracking structure having tracking entries to track memory hazards introduced by instruction re-ordering. As discussed earlier, these are referred to herein as vertical memory hazards, and it will be appreciated by those skilled in the art that a number of existing tracking structures exist for seeking to detect such vertical memory hazards.

In such an OOO system, then the earlier described tracking storage that is used by the checking circuitry to detect horizontal memory hazards can be realised by augmenting the existing OOO tracking structures. In particular, the tracking entries in one or more of the OOO tracking structures may be augmented such that the tracking storage is incorporated within such tracking structures, to thereby allow the checking circuitry to detect the inter lane memory hazards that occur due to allocating the scalar memory access operations within the series to different lanes of processing. This can provide a particularly cost effective implementation in terms of additional transistor count, area, and/or power consumption.

The OOO tracking structures that are augmented in the manner discussed above can take a variety of forms. In one example implementation, one of the OOO tracking structures comprises a store buffer to temporarily store write data produced by execution of store instructions until it is determined that the write data can be committed to memory, and the store buffer is augmented to allow the tracking information to be maintained therein for speculative vector store instructions within the identified code region.

In addition, or alternatively, one of the OOO tracking structures that may be augmented comprises a memory hazard buffer to track execution of memory access instructions issued out-of-order, and the memory hazard buffer is augmented to allow the tracking information to be maintained therein for speculative vector load instructions within the identified code region.

There are a number of ways in which vector memory access instructions can be identified as being the earlier-discussed speculative vector memory access instructions, and hence require monitoring by the checking circuitry. In one example implementation, each vector memory access instruction in the identified code region is assumed to be a speculative vector memory access instruction, such that the checking circuitry is arranged to check for inter lane memory hazards associated with execution of each vector memory access instruction in the identified code region. Hence, by way of example, where the earlier mentioned SV start and SV end instructions are used, then any vector memory access instruction appearing between the SV start instruction and the SV end instruction may be viewed as being a speculative vector memory access instruction. This can provide a particularly efficient implementation, as there is no need to modify instruction encodings to differentiate between speculative and non-speculative versions of vector memory access instructions.

In an alternative implementation, the vector memory access instructions may be tagged to distinguish between those vector memory access instructions that are speculative vector memory access instructions and hence should be monitored by the checking circuitry, and those vector memory access instructions for which it is known no inter lane memory hazards will occur and hence which can be ignored by the checking circuitry. Hence, in such an implementation, it is possible to have vector memory access instructions within the identified code region that do not need to be checked, and this can hence reduce unnecessary checking by the checking circuitry. It is also possible for the tag information to be sufficient to group the speculative vector memory access instructions that need to be checked with respect to each other. Hence, the identified code region can include different groups of speculative vector memory access instructions, where within a group each speculative vector memory access instruction needs checking with respect to each other speculative vector memory access instruction in that group, but does not need checking with respect to vector memory access instructions in the other group. As a result, it will be appreciated that the tag information can be used to segregate disjoint areas of memory, for example under compiler control. Where it can prove independence between program objects (for example arrays), a compiler can give each object accessed in the speculative region a unique tag, which then serves to reduce the amount of the checking required by the hardware.

By using such tagging schemes, this can result in fewer checks and smaller space requirements, or enable larger loops to be vectorised, because the address information for any "no-check" instructions does not need to be recorded within the tracking storage at runtime.

Particular examples will now be described with reference to the Figures.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. Out-of-order handling components 12 are provided at a next stage to handle out-of-order execution of instructions. These components can take a variety of forms, including for example a reorder buffer (ROB) and rename circuitry. The ROB is used to keep track of the progress of the instructions and ensure that the instructions are committed in order, even though they are executed out-of-order. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A write back stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. The load/store unit 26 may use a translation lookaside buffer 36 and the fetch unit 6 may use a translation lookaside buffer 37 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor will typically not have the OOO handling components 12.

As discussed earlier, the techniques described herein allow a series of scalar memory access operations to be speculatively vectorised before it is known whether through-memory dependencies (TMDs) will arise. A mechanism is then provided that enables any such memory address conflicts to be detected in hardware, and to automatically trigger selective re-execution for only the specific lanes affected. TMDs are referred to as horizontal memory hazards herein, and there are a number of different horizontal memory hazards that may be detected using the techniques described herein. In particular, the mechanism described herein is able to detect RAW inter lane memory hazards, WAR inter lane memory hazards and WAW inter lane memory hazards. Provided below are examples of each of these types of hazard, for both vector operations representing contiguous accesses and vector operations representing discontiguous accesses:

| RAW hazard—gather/scatter pair: | | |
|---|---|---|
| LD | [A0, A1, A2, A3] | // LD gets the old value at address A2, should get the new one |
| ST | [A4, A2, A6, A7] | |

| RA Whazard—contiguous accesses: | | |
|---|---|---|
| LD | [A0: A0 + 16] | // LD gets the old value at addresses [A0 + 8: A0 + 16] |
| ST | [A0 + 8: A0 + 24] | |

| WAR hazard—gather/scatter pair: | | |
|---|---|---|
| ST | [A0, A1, A2, A3] | |
| LD | [A4, A2, A6, A7] | // LD gets the new value at address A2, should get the old one |

| WAR hazard—contiguous accesses: | | |
|---|---|---|
| ST | [A0: A0 + 16] | |
| LD | [A0 + 8: A0 + 24] | // LD gets the new value at addresses [A0 + 8: A0 + 16], should get the old one |

| WAW hazard—gather/scatter pair: | | |
|---|---|---|
| ST | [A0, A1, A2, A3] | |
| ST | [A4, A2, A6, A7] | // Memory at address A2 won't get the latest value |

| WAW hazard—contiguous accesses: | | |
|---|---|---|
| ST | [A0: A0 + 16] | |
| ST | [A0 + 8: A0 + 24] | // Memory at address [A0 + 8: A0 + 16] won't get the latest value |

In the above examples, the instructions are written in original program order.

In accordance with the techniques described herein, hardware checks can be performed at execution time in relation to speculative vector memory access instructions within an identified code region, those speculative vector memory access instructions being employed to perform speculative vectorisation of a series of scalar memory access operations using a plurality of lanes of parallel processing. For example, the execute stages 18 of the data processing apparatus 2 may be arranged in a SIMD arrangement, to enable an operation to be performed in parallel across multiple lanes of parallel processing provided by the circuitry in the execute stages 18.

There are a number of ways in which the identified code region in which checking is required can be specified, but as discussed earlier in one example two machine instructions are introduced, referred to as SV start and SV end instructions. In particular, these instructions are used to mark the start and end of the identified code region, which can also be referred to herein as the speculative region. The code for a simple loop that makes use of such speculative markers is shown below (in particular this may represent the main loop of a histogram update example):

```
loop:
    ld1w        z0.s, p0/z, [x0, x2, ls1 #2]
    sv_start
    ld1w        z1.s, p0/z, [x1, z0.s, uxtw #2] // gather
    add         z1.s, z1.s, #1
    st1w        z1.s, p0, [x1, z0.s, uxtw #2] // scatter
    sv_end
    incw        x2
```

```
    whilelo      p0.s, x2, x3
    b.first      loop
    // the gather/scatter pair can lead to potential
    RAW hazards between lanes
```

The first load instruction ld1w performs a contiguous load operation in order to load a series of data elements into the destination register z0. The address is computed by multiplying an offset in scalar register x2 by a scaling factor of 4 (due to the elements in this example being word sized elements (i.e. 32 bit (4 byte) elements)), and then adding the adjusted offset to the value in scalar register x0. The SV start instruction then identifies the start of the identified code region, and in this example it will be seen that that identified code region includes both a gather instruction and a scatter instruction. Each of these instructions can be viewed as being a speculative vector memory access instruction. For each load operation required by the gather instruction (each load operation being performed in a different lane of parallel processing), the address is determined by taking the corresponding element of the vector source register z0 to form a vector offset, multiplying the vector offset by a scaling factor of 4, and adding that adjusted vector offset to the contents of the scalar register x1. An access is then performed to the address in order to retrieve a data value which is then stored at the corresponding element position within the destination register z1.

In both of the load instructions discussed thus far a predicate register p0 is specified, with the suffix "/z" indicating that the result for any inactive lane should be zero.

Within the identified code region, a vector add instruction is executed in order to add 1 to every data element within the vector register z1. Thereafter, the vector scatter instruction st1w is executed in order to store the data elements in the vector source register z1 back to a series of memory addresses computed using the value in the scalar register x1 and the corresponding elements within the source vector register z0 (again the corresponding elements within the source vector register z0 being multiplied by 4 given the use of word sized elements, prior to addition to the value in the scalar register x1). For the scatter operation, a predicate can be specified so that only the data values within the active lanes are stored back to memory, thereby implementing an implicit merge operation.

The SV end instruction then identifies the end of the identified code region, and triggers a determination as to whether there is a need to re-execute the gather, add and scatter instructions for one or more lanes, using information maintained within a status register as a result of the checks performed during the execution of the gather and scatter operations, as will be discussed in more detail later.

The two instructions following the SV end instruction then set up some values for the next iteration of the loop. The increment instruction increments the value in the scalar register x2 by the number of 32 bit elements in a vector register. The while instruction is then used to set the bits in the predicate p0. In particular, while the value in x2 is less than the value in x3 (the value in x3 storing information about the number of scalar iterations of the loop), then the bits in the predicate p0 are set equal to true. Hence, purely by way of example, if the original scalar loop had twenty iterations, and each vector loop can handle eight scalar iterations, then the predicate p0 will be set all true on the first iteration and the second iteration, but on the third iteration will take the form "00001111". The final branch instruction then branches back to the start of the loop if at least the first element of the predicate p0 is set.

It will be appreciated that there is the potential for the pair of gather and scatter instructions to lead to RAW inter lane memory hazards. Prior to the techniques described herein, this may have prevented the compiler from generating a vectorised version of the original scalar code, but in accordance with the techniques described herein, a speculative vectorisation of those scalar operations can be made, with the hardware checking for the presence of such RAW hazards during execution.

Figure 2:
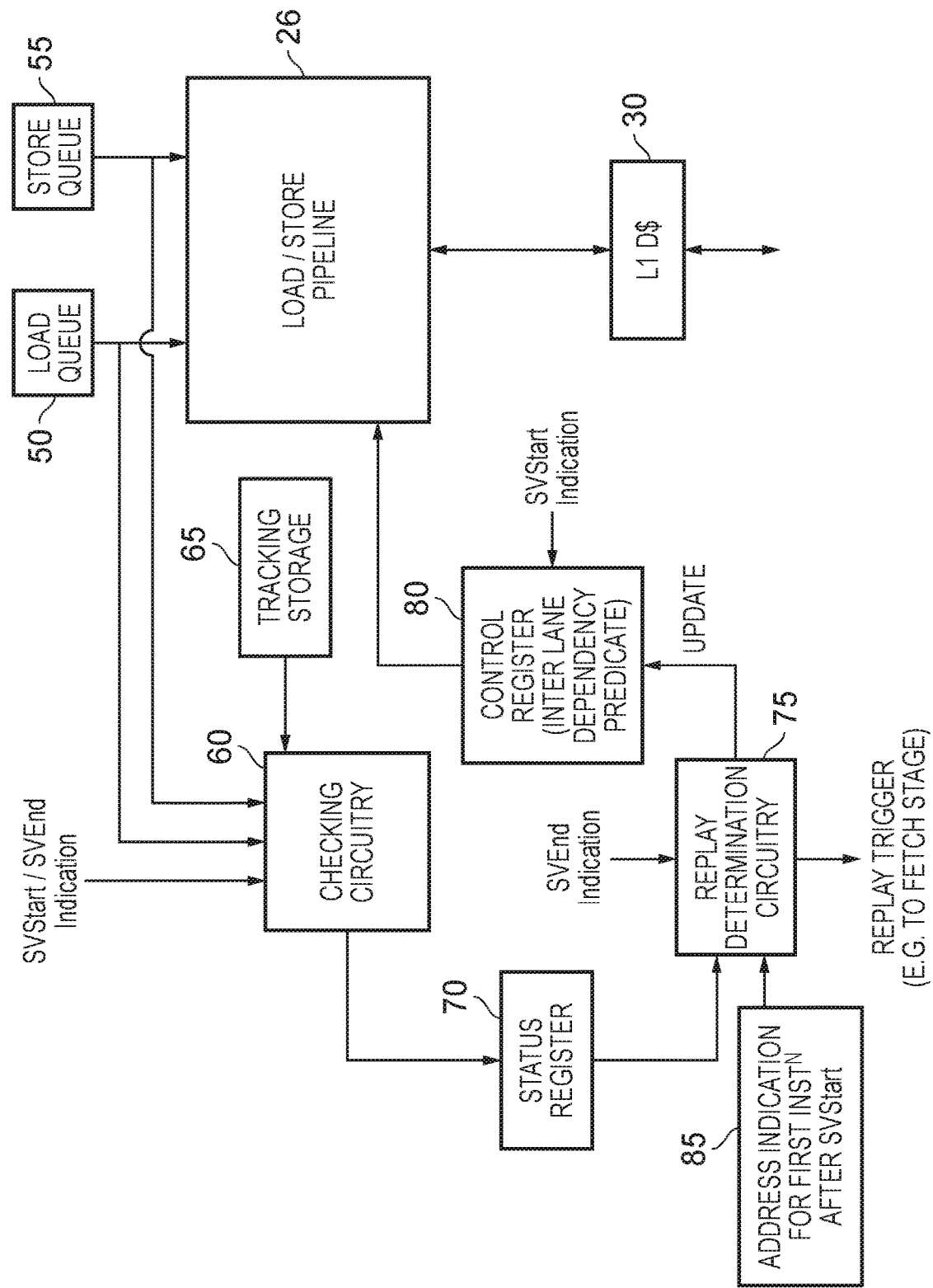
FIG. 2 is a block diagram illustrating the components that may be incorporated within the apparatus of FIG. 1 in order to facilitate the execution of speculative vector memory access instructions in accordance with one example implementation.

FIG. 2 is a block diagram illustrating some components that may be provided within the apparatus of FIG. 1 to implement the techniques described herein. Any speculative vector memory access instructions will be executed within the load/store pipeline 26, which as shown in FIG. 2 can be fed by the contents of a load queue 50 and a store queue 55. The load/store pipeline 26 will then access memory via the level 1 data cache 30 in order to read data from memory for storing in the registers 14 or for storing data from the registers 14 back to memory.

Tracking storage 65 is provided to maintain, for each speculative vector memory access instruction that is executed by the load/store pipeline 26, certain tracking information that provides at least an indication of a memory address being accessed within each lane. More details of the tracking storage will be described later, with reference to FIGS. 3 and 4. Whilst the tracking storage 65 can be a dedicated structure provided purely for tracking information about the speculative vector memory access instructions, as will be discussed in more detail later with reference to FIG. 5 in some instances the tracking storage can be implemented by augmenting existing structures that are already provided within the data processing apparatus 2 in situations where the apparatus 2 is used to facilitate out-of-order processing of instructions.

The checking circuitry 60 is triggered to perform certain checking operations when execution is within the identified code region discussed earlier, i.e. within the code region identified by the SV start and SV end instructions. Hence, the SV start and SV end instructions are used to provide triggering information to the checking circuitry 60 to identify when the checking circuitry should monitor the load and store operations being performed by the load/store pipeline 26, and in particular monitor those operations in order to detect any inter lane memory hazard that results from the execution of those memory access instructions. When performing such checking operations, the checking circuitry 60 makes reference to the tracking storage 65 in order to have an understanding of the memory addresses being accessed within the various lanes, and the types of speculative memory access operations being performed.

A status register 70 may be provided which is used to maintain an indication of each lane for which the checking circuitry determines an inter lane memory hazard of at least a first type. In particular, as will be discussed in more detail later the status register is used to keep track of any RAW inter lane hazards detected, and also in some implementations to keep track of any WAW inter lane hazards. However, an alternative mechanism can be used to resolve WAR hazards without needing to perform any replay of the instructions in the identified code region, and accordingly there is no need to keep track of WAR hazards within the status register 70.

In response to the SV start instruction, a trigger is sent to a control register 80 to initialise an inter lane dependency predicate. This is an implicit predicate in that it is not a predicate that can be specified in relation to any particular instruction, and is not visible to the programmer. Instead, it is used to control the selective re-execution of the identified code region within one or more lanes. In response to the SV start indication, the inter lane dependency predicate is initialised to identify all lanes as being active, so that on the first execution of the identified code region the execution is unconstrained by the inter lane dependency predicate. Whilst the control register 80 is shown as being referenced by the load/store pipeline 26, it should be noted that the control register controls execution of instructions by any of the execution units within the execute stage 18, and hence for example would be referenced by the ALU 22 when executing the vector add instruction in the example loop discussed earlier.

On encountering the SV end instruction, a trigger is sent to the replay determination circuitry 75, which then determines whether the status register 70 identifies any lanes as having an inter lane memory hazard. If so, then the replay determination circuitry is arranged to update the contents of the control register 80 using the information maintained in the status register 70, so as to identify the lanes for which re-execution is required. In addition, the replay determination circuitry 75 issues a replay trigger, for example by issuing an address of the first instruction following the SV start instruction to the fetch stage 6, so as to cause the required instructions to be refetched for execution. Any intervening instructions within the pipeline may then be flushed using standard mechanisms.

When the SV start instruction is executed, it causes a storage element 85 to be updated to identify the address for the first instructions after the SV start instruction, and hence for example to identify the address of the ld1w gather instruction in the specific example case discussed earlier. That storage element 85 is then referenced by the replay determination circuitry 75 when needed in order to identify the address of that instruction when issuing the replay trigger.

Figure 3:
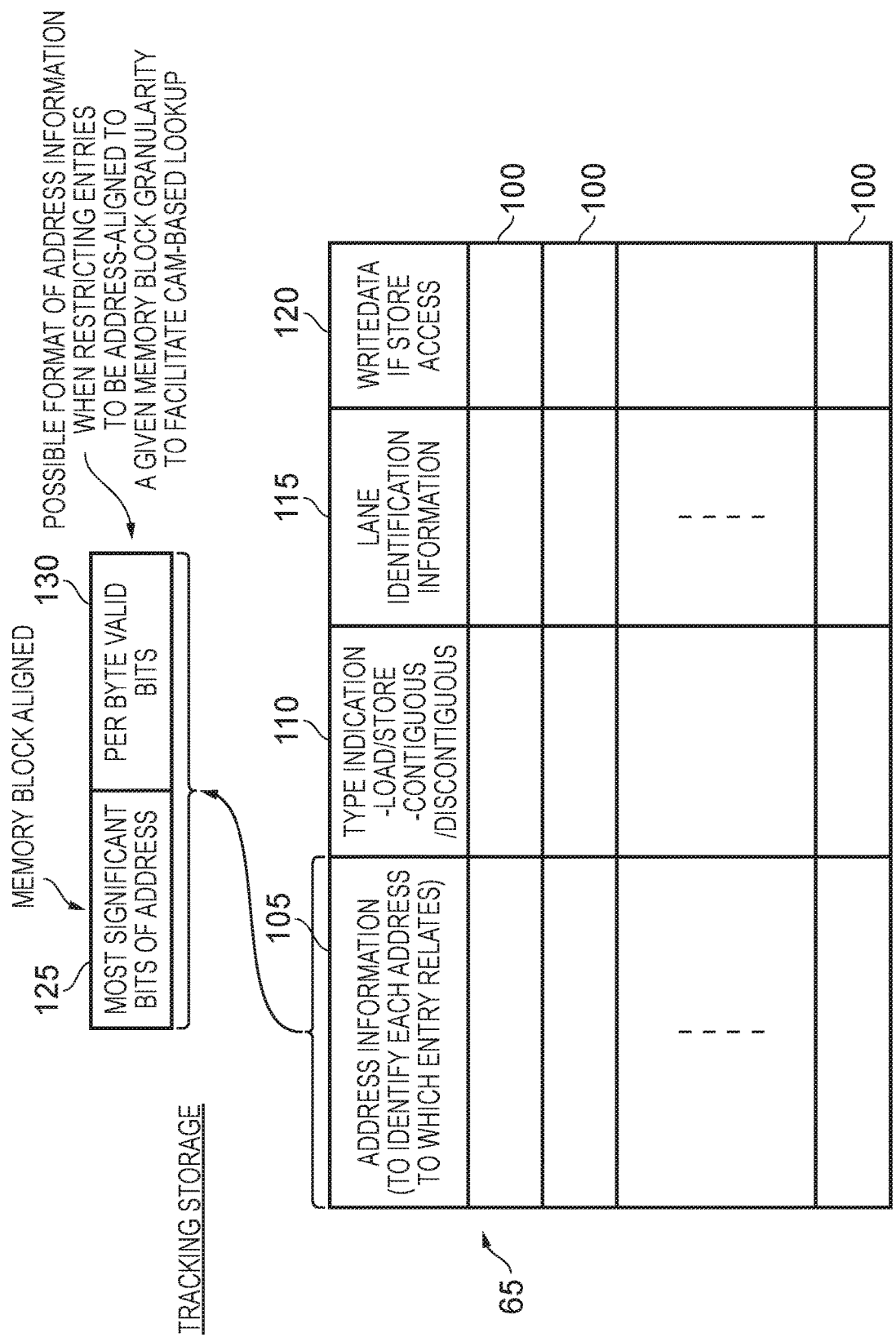
FIG. 3 illustrates in more detail information that can be captured within the tracking storage of FIG. 2 in one example arrangement.

FIG. 3 is a diagram illustrating in more detail information that may be maintained within the tracking storage 65 in one example implementation. As shown, the tracking storage 65 may include a plurality of entries 100, with each entry being used to maintain tracking information for at least a subset of the scalar memory access operations performed by execution of a speculative vector memory access instruction. An address information field 105 is used to identify each address to which the entry relates. In one example implementation, the memory addresses that can be associated with any individual entry 100 are constrained so that they are address aligned to a given memory block granularity, and hence the address information 105 may be captured within a sub-field 125 identifying the most significant bits of the address. The number of most significant bits required will depend on the size of the memory block granularity. This can facilitate CAM-based lookups, since for any specified address, a lookup can be performed within each of the entries 100 based on the information maintained in the field 125 in order to detect whether there is a hit. The address information can then be supplemented by per-byte valid bits 130 used to identify the actual addresses associated with the information maintained in that entry.

A type indication field 110 is used to identify whether the entry relates to a speculative vector load instruction or a speculative vector store instruction. Further, in one example implementation the type indication also captures an indication as to whether a load instruction is a contiguous load instruction or a discontiguous load instruction, and similarly for a store instruction can identify whether the store instruction is performing a contiguous access or a discontiguous access. As discussed earlier, discontiguous load instructions can be referred to as gather instructions and discontiguous store instructions can be referred to as scatter instructions.

A lane identification information field 115 can be used to identify the particular lane or lanes to which the address information maintained in the field 105 relates. For contiguous accesses, there may be no need for specific lane identification information as it may be possible to determine the relevant lanes from the address information itself, for example with reference to the per-byte valid bits 130. In particular, if the data element size is known, which in one example implementation can be captured within the entry 100, then it is known how many data elements are presented by the per-byte valid bits, and since the accesses are contiguous that information can be mapped directly to the relevant lanes.

However, for discontiguous accesses, then in one example implementation a separate entry is provided for each address, and it is not possible from the address information itself to identify which lane that address relates to. Hence, the actual lane indication can be provided within the lane identification information field 115. It will be appreciated that it is important to have knowledge of the lane to which each address relates in order to be able to determine the presence or absence of inter lane memory hazards, since as discussed earlier those inter lane memory hazards occur due to a given address being used in different lanes across multiple speculative vector memory access instructions.

For store operations, an additional field 120 may be used to capture the write data that is being stored by that store operation. In some implementations, that write data could be stored in a separate structure, but as will be discussed in more detail later in one example implementation the store buffer used to retain that write data is also augmented so as to capture the other information required by the tracking storage, and hence the tracking storage can be viewed as maintaining the write data in addition to the other information.

Figure 4:
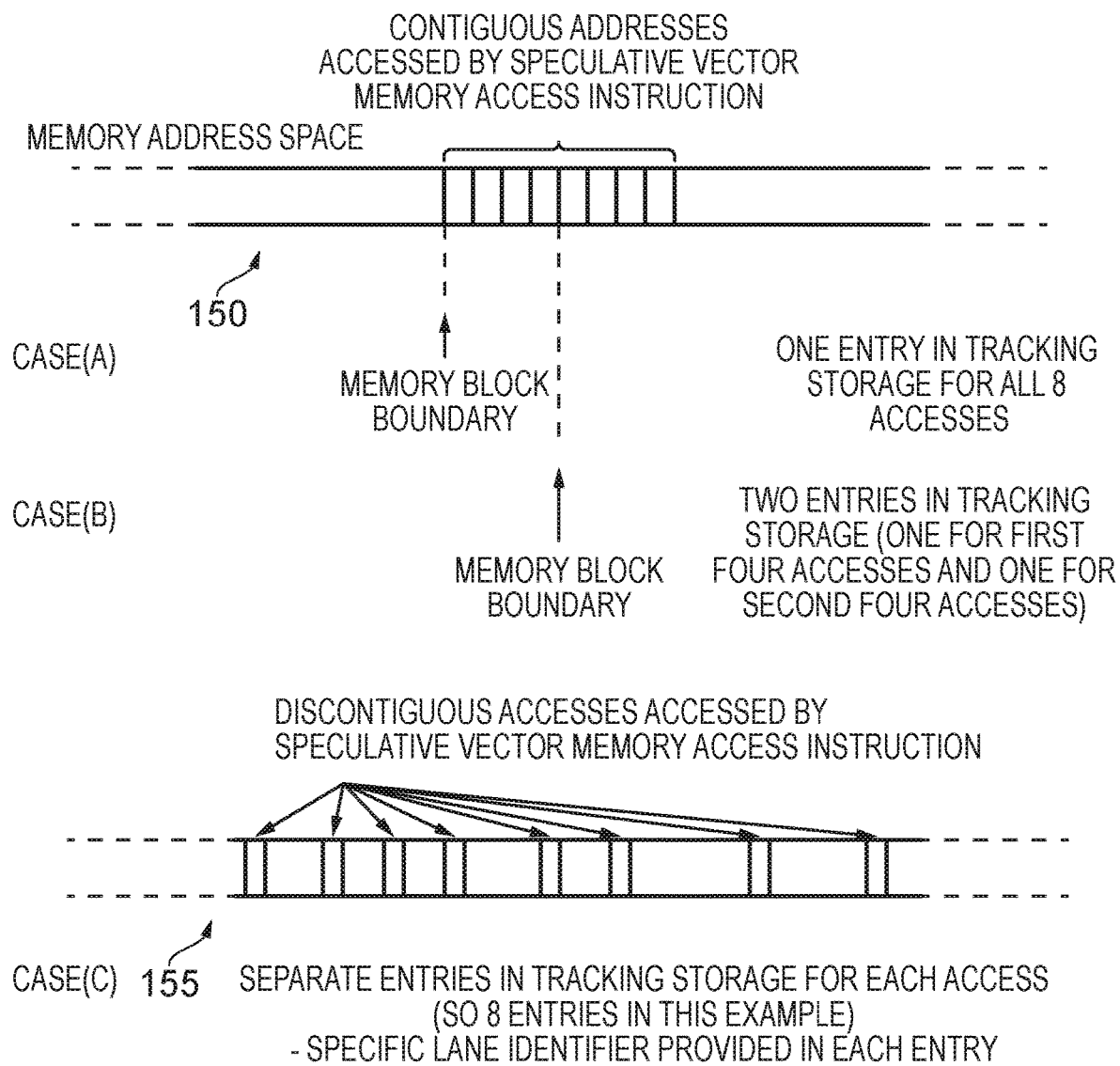
FIG. 4 illustrates how entries within the tracking storage may be populated for a number of example use cases, in accordance with one example implementation.

FIG. 4 is a diagram to schematically illustrate how entries within the tracking storage 65 may be utilised, dependent on the type of access being performed. A region 150 of memory address space is shown in FIG. 4, and cases A and B relate to contiguous addresses being accessed by a speculative vector memory access instruction. If all of the contiguous addresses are aligned with a memory block boundary, then as indicated in case A only one entry in the tracking storage may be needed in order to capture the tracking information for all of the contiguous accesses, in this example there be eight contiguous accesses.

However, as indicated in case B, if the contiguous accesses cross a memory block boundary, then multiple entries in the tracking storage may be needed. In the particular example shown, four of the accesses occur before a memory block boundary and four after, and hence in that scenario two entries will be used within the tracking storage, one for four of the accesses and another for the other four of the accesses.

An alternative representation 155 of the memory address space is also shown, where a series of discontiguous accesses are being performed by a speculative vector memory access instruction, and in particular an example where eight discontiguous accesses are being performed as shown. In one example implementation, separate entries will be maintained in the tracking storage for each access, and hence there will be eight entries in this example. Specific lane identifying information will be provided within each entry, using the lane identification information field 115.

Figure 5:
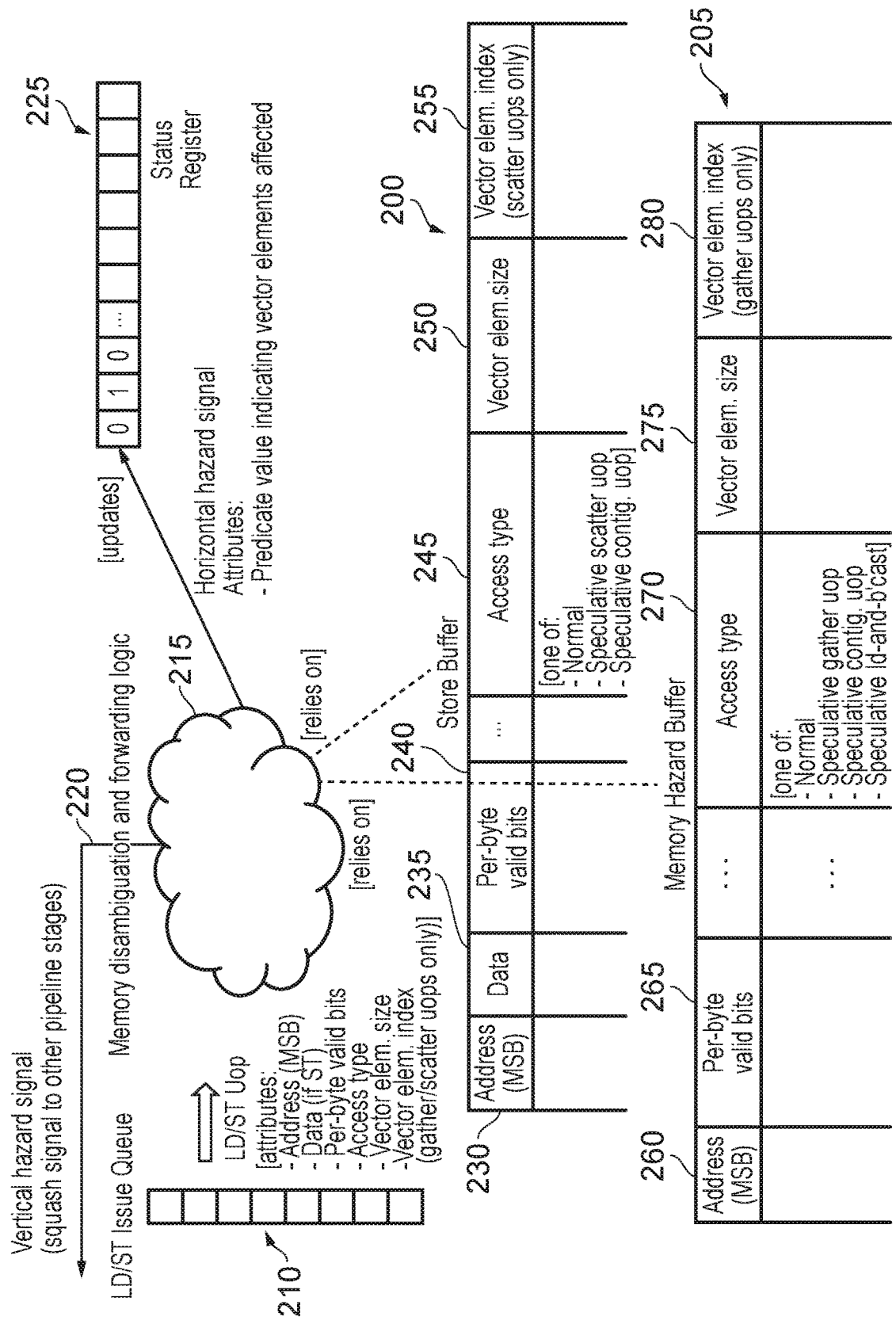
FIG. 5 schematically illustrates how the tracking storage may be implemented using augmented versions of a store buffer and a memory hazard buffer already provided within an out-of-order system, in accordance with one example arrangement.

The techniques described herein can be used both in in-order systems and out-of-order systems. However, when the techniques are adopted in out-of-order systems, then the tracking storage can be implemented by augmenting existing structures that are already provided to handle any vertical memory hazards that may result from re-ordering instructions. A specific example implementation is illustrated in FIG. 5, where both a store buffer (SB) 200 and a memory hazard buffer (MHB) 205 are augmented to maintain the required tracking information to detect inter lane memory hazards (i.e. horizontal memory hazards). A load/store issue queue 210 is shown, from which load and store micro operations are output for processing by the load/store unit. Memory disambiguation and forwarding logic 215 can be used in the standard manner to detect vertical hazards, with a vertical hazard signal being issued over path 220 when a vertical memory hazard is detected. As discussed earlier such vertical memory hazards can result from the reordering of instructions, due to memory aliasing occurring within the same lane across multiple reordered instructions. In the techniques described herein, vertical memory hazards always take precedence over horizontal memory hazards, and hence if a vertical memory hazard is detected there is no need to also check for a horizontal memory hazard, and the onward processing will be dictated by the vertical hazard signal issued over path 220.

However, in the absence of vertical memory hazards, then the memory disambiguation and forwarding logic 215 is augmented so as to also implement the functionality of the earlier-described checking circuitry to seek to detect whether there are any horizontal (i.e. inter lane) memory hazards. The status register 225 is updated to reflect the result of such checking operations, and in particular for any lane where an inter lane memory hazard of at least one type is detected, a logic one value can be stored in the corresponding bit of the status register. In this example the status register 225 has a bit for each lane, and hence a logic zero value indicates a lane where no inter lane memory hazard (or at least no inter lane memory hazard of the type or types being monitored by the status register) has been detected, and a value of 1 indicates that an inter lane memory hazard of the type or types being monitored by the status register has been detected. Hence, the status register can be viewed as establishing a predicate value indicating the vector elements, or lanes, affected by inter lane memory hazards.

In addition to the usual information output from the issue queue in association with load and store micro operations, an indication of vector element size and vector element index information (which is only required for gather or scatter micro operations) is also output so that that information can be used when populating the store buffer entries or memory hazard buffer entries as required.

The store buffer 200 has an address information field 230 along with a per-byte valid bits field 240 to identify the addresses to which the entry relates. The fields 230, 240 can be viewed as corresponding to the fields 125, 130 discussed earlier with reference to FIG. 3. The write data is also captured within the field 235, since each entry in the store buffer relates to a write operation. Fields 245, 250, 255 indicate additional fields that are used in order to augment the store buffer so as to provide information sufficient to enable the checking circuitry 215 to check for the presence of horizontal memory hazards. In particular, an access type field 245 is used to identify whether the access type is normal, i.e. that entry does not relate to one of the speculative vector memory access instructions that needs to be subjected to the check by the checking circuitry, or whether instead it relates to a speculative vector memory access, i.e. an access that is to be checked against by the checking circuitry. As illustrated by FIG. 5, this access type information can also identify whether the speculative store operation is for a contiguous access or a discontiguous (i.e. scatter) access.

As also shown in FIG. 5, the vector element size information can be captured within the field 250. As discussed earlier, this can be used for example to interpret the per-byte valid bits 240. The vector element index field 255 is also used to capture the vector element index information, i.e. the lane or lanes to which the entry relates. As noted in FIG. 5, within the store buffer this is only needed for scatter micro operations.

Whilst the store buffer 200 is used to keep track of addresses and data of in-flight store operations that are still in speculative state, a memory hazard buffer 205 is also provided which is typically used to keep track of in-flight memory accesses issued out-of-order in order to make sure that their execution preserves the semantics of the original program and the memory consistency model of the target ISA. For the sake of simplicity, we will focus here on a memory disambiguation unit targeting a relaxed consistency model that allows younger loads to be freely reordered with respect to older stores as long as no memory aliasing occurs. Typically, this structure would need to keep track of addresses of loads that were issued out-of-order, and checks will be performed upon issuing store operations to make sure that their addresses do not overlap with the address of one of these younger loads, otherwise a pipeline squash will be triggered due to a vertical hazard being detected. However, to also support the resolution of horizontal hazards, the memory hazard buffer 205 can be supplemented with additional information as shown in FIG. 5.

Hence, in addition to the address 260 and per-byte valid bits fields 265, an access type field 270 is used to capture whether the entry relates to a normal access, i.e. one for which no checks need to be performed to determine the presence of horizontal memory hazards, or relates to a speculative vector load instruction that does need to be referenced when performing the above-described checks for horizontal memory hazards. As shown in FIG. 5, the type information can also distinguish between speculative contiguous micro operations and speculative gather (i.e. discontiguous) micro operations. It can also be used to distinguish another type of speculative vector load operation, referred to herein as speculative load and broadcast operation. A load and broadcast access loads a scalar value from memory and repeats it across a destination vector register.

As with the store buffer 200, a vector element size field 275 can be used to identify the size of the vector elements, and hence enable interpretation of the per-byte valid bits 265 when determining how many lanes the address information relates to. Further, a vector element index field 280 can be provided to store vector element indexing information required to identify the lane in association with entries used for gather micro operations.

It is worth noting that, while for vertical disambiguation only loads that are issued out-of-order need to be recorded in the MHB 205, when adopting the horizontal memory hazard checking technique it may be necessary to keep track of all vector loads issued in the speculative region. The compiler will have knowledge of the total number of loads and stores in the speculative region, and hence can ensure that vectorisation does not cause overflow of the MHB and SB structures.

Figure 6A:
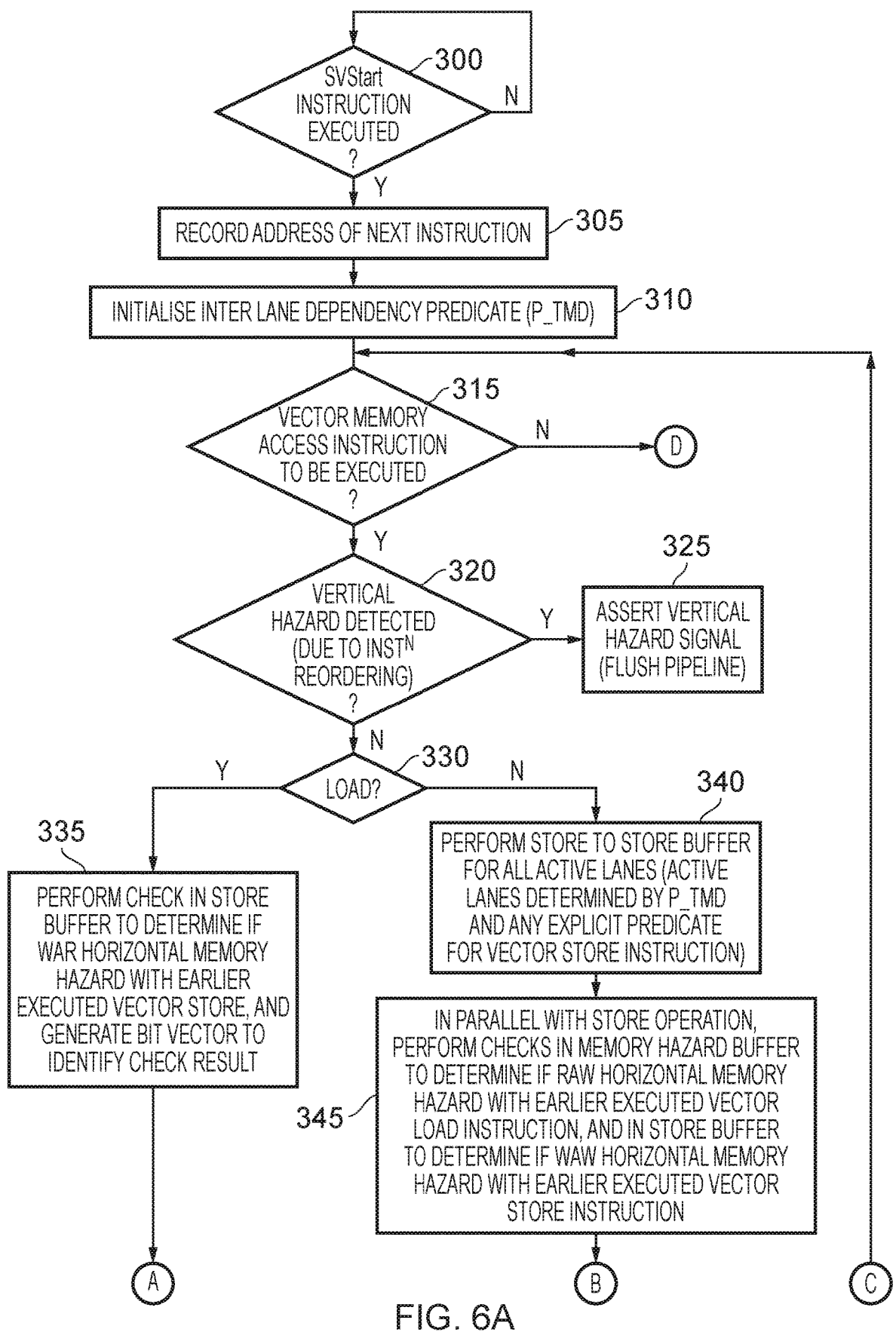
FIGS. 6A and 6B provide a flow diagram illustrating how an identified code region may be executed in accordance with one example arrangement.
Figure 6B:
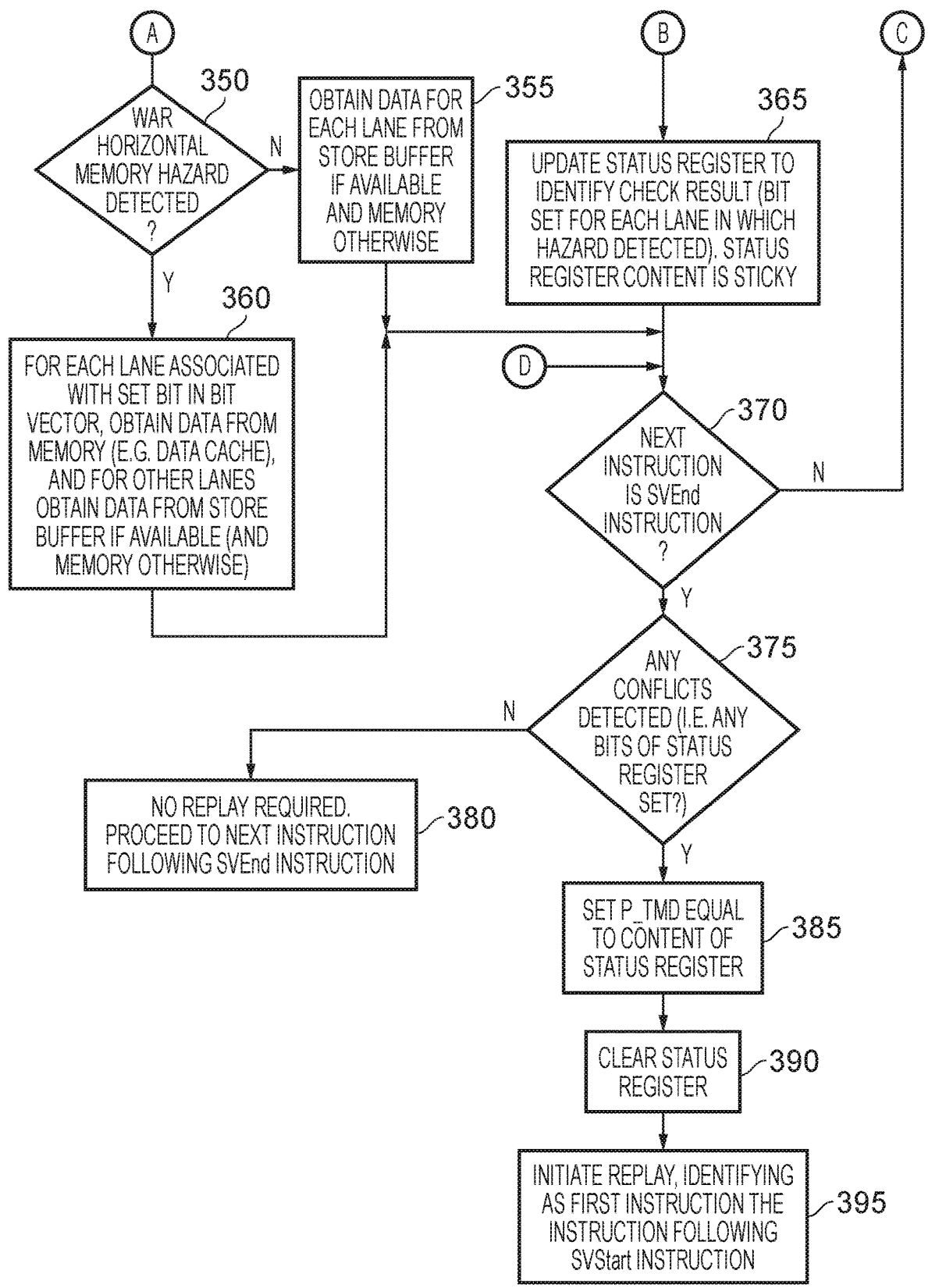

FIGS. 6A and 6B provide a flow diagram illustrating how an identified code region may be executed in accordance with one example arrangement. At step 300, the process awaits execution of an SV start instruction. Once an SV start instruction is executed, then the address of the next instruction following the SV start instruction is recorded at step 305, for example by being written into the storage element 85 referred to earlier in FIG. 2. In addition, the inter lane dependency predicate (referred to herein as the P_TMD) is initialised, as discussed earlier this predicate in one implementation being maintained within the control register 80.

At step 315, it is then determined whether a vector memory access instruction is to be executed, and if not the process proceeds to step 370 in FIG. 6B to determine whether the next instruction is the SV end instruction. If not, the process returns to step 315. When at step 315 it is determined that a vector memory access instruction is to be executed, then it is determined at step 320 whether a vertical hazard is detected, as discussed earlier this being a hazard due to reordering. As discussed for example with reference to FIG. 5, standard memory disambiguation mechanisms can be used to detect vertical hazards, and in the presence of a vertical hazard a vertical hazard signal is asserted at step 325, which will typically cause flushing of the pipeline.

However, if a vertical hazard is not detected, the process proceeds to step 330 where it is determined whether the vector memory access instruction detected at step 315 is performing a load or a store. If it is performing a load, then at step 335 a check is performed in the store buffer 200 to determine if a WAR horizontal memory hazard is present with regard to an earlier executed vector store instruction. In particular, a WAR inter lane memory hazard may occur where a given address is used in both a higher lane for a speculative vector store instruction and a lower lane for a speculative vector load instruction that appears after the speculative vector store instruction in original program order.

At step 335, a bit vector is generated to identify the check result, and in particular there will be a bit for each lane, and the bit vector will be set to identify each lane for which a WAR horizontal memory hazard has been detected. The process then proceeds to step 350 where it is determined whether a WAR horizontal memory hazard has been detected, i.e. whether any bit is set in the bit vector. If not, then at step 355 the required data can be obtained for each lane from the store buffer if available, and from memory otherwise. In particular, since there is no WAR hazard, it is safe to use the contents of the store buffer when that store buffer stores the data required. The data is held within the store buffer until any potential hazards have been determined, and accordingly it is correct to obtain the data from the store buffer if available in the absence of hazards, since that will be the up-to-date data that should be provided when processing the load operation.

However, if a WAR horizontal memory hazard is detected, then at step 360, for each lane associated with a set bit in the bit vector, the data is obtained from memory, for example by accessing the level one data cache 30, rather than obtaining the data from the store buffer. In particular, by going to memory to get the data, the data that should have been obtained by the load operation will be obtained, and hence the WAR horizontal memory hazard will be resolved. For any other lanes for which a bit is not set in the bit vector, then the required data can be obtained from the store buffer if available, and from memory otherwise.

If at step 330, it is determined that the memory access instruction is a store instruction, then the process proceeds to step 340 where a store is performed to the store buffer for all active lanes. The active lanes will be determined by the P_TMD (i.e. the inter lane dependency predicate) and any explicit predicate specified for the vector store instruction. As discussed earlier, during an initial execution of the identified code region (i.e. the code region between the SV start and the SV end instruction), the inter lane dependency predicate will be all set, so that it does not constrain the operations performed when executing the instructions within the identified code region.

In parallel with the store operation, then at step 345 checks are performed in the memory hazard buffer 205 to determine if there are any RAW horizontal memory hazards with an earlier-executed vector load instruction. In addition, checks can be performed in the store buffer 200 to determine if there are any WAW horizontal memory hazards with an earlier-executed vector store instruction.

The process then proceeds to step 365 where the status register is updated to identify the check result of the checks performed at step 345. In particular, a bit can be set for each affected lane in which a hazard has been detected. The status register contents are arranged to be sticky, so that once they are set they are not cleared until any replay determination has been made in response to executing the SV end instruction.

Following performance of any of the steps 355, 360 or 365, or following the "no" path from step 315, the process proceeds to step 370 where it is determined whether the next instruction is the SV end instruction. If not, the process returns to step 315.

However, once the SV end instruction is encountered, then the process proceeds to step 375 where it is determined whether any conflict was detected, i.e. whether any bits of the status register have been set. If not, the process proceeds to step 380 where it is determined that no replay is required. The process then proceeds to the next instruction following the SV end instruction.

However, if a conflict is detected at step 375, then the inter lane dependency predicate is set to be equal to the content of the status register, and thereafter at step 390 the status register is cleared. A replay is the initiated at step 395 with the replay determination circuitry 75 issuing a trigger signal identifying as the next instruction the instruction immediately following the SV start instruction. As discussed earlier, the replay determination circuitry 75 can obtain this information from the storage element 85. This replay trigger procedure may involve sending a signal to the fetch stage 6 to cause instructions to begin to be fetched from the identified instruction, with the remaining instructions in the pipeline being flushed.

Figure 7:
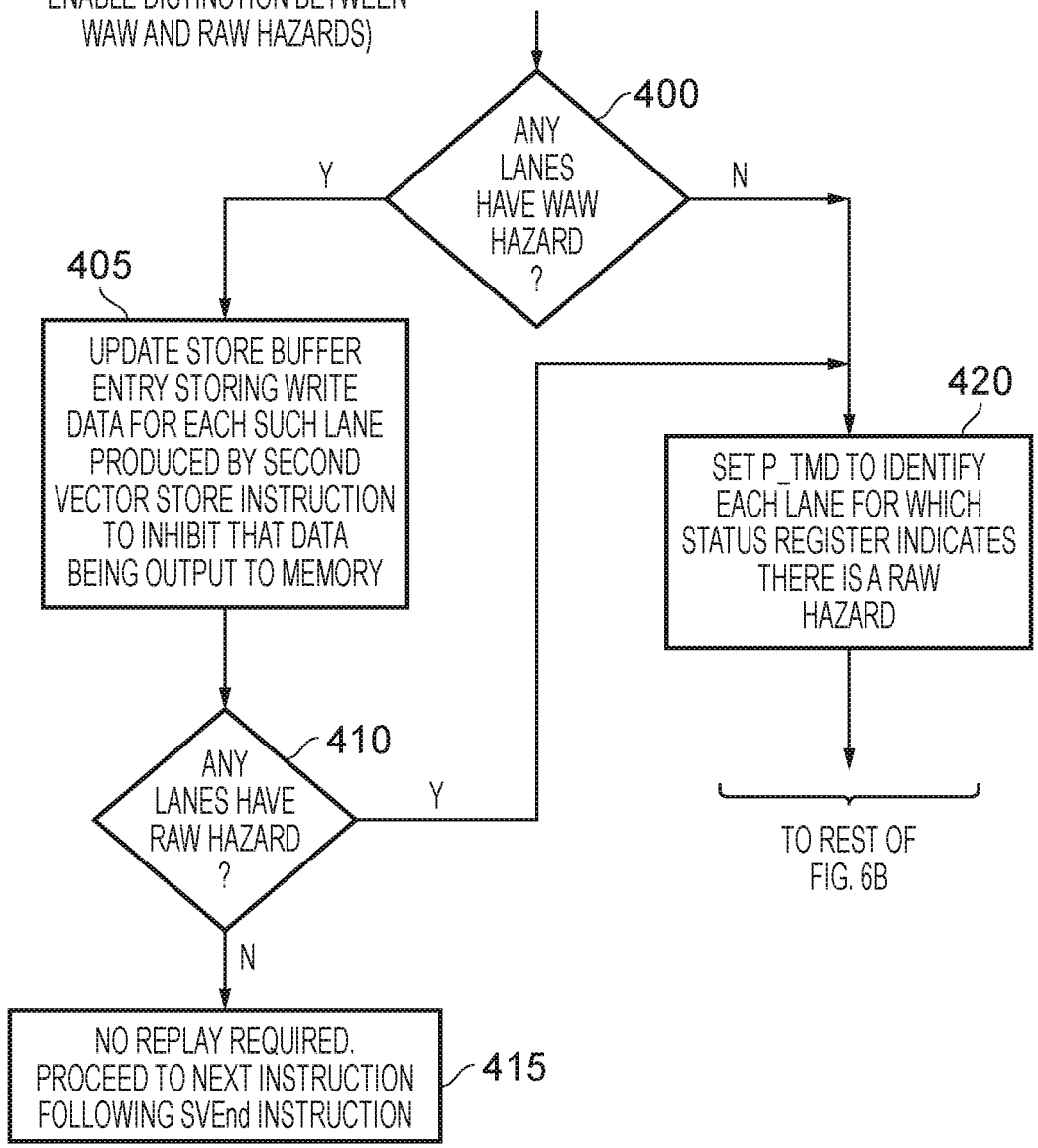
FIG. 7 is a flow diagram illustrating some steps that may be performed in an alternative implementation instead of step 385 of FIG. 6B.

In one example implementation, the status register 70 only has a single bit per lane and hence does not distinguish between detection of a RAW horizontal memory hazard and a WAW horizontal memory hazard. However, FIG. 7 illustrates an alternative implementation, where the status register has multiple bits per lane to enable distinction between WAW and RAW horizontal memory hazards, and in particular FIG. 7 illustrates a sequence of steps that can be performed instead of step 385 of FIG. 6B. At step 400, it is determined whether any lanes have a WAW hazard. If not, the process proceeds to step 420 where the inter lane dependency predicate is set to identify each lane for which the status register indicates that there is a RAW hazard. The process then continues to perform the rest of the process of the earlier-discussed FIG. 6B, by proceeding to step 390.

However, if it is determined at step 400 that at least one lane has a WAW hazard, then at step 405 the relevant store buffer entry is updated. In particular, the store buffer entry that stores the write data for each such lane for which a WAW hazard has been detected is updated to inhibit that data being output to memory. For the example of first and second vector store instructions appearing in that order in original program order, this will involve updating the store buffer entry that stores the write data produced by the second vector store instruction to inhibit the data in one or more of its lanes from being output to memory.

Thereafter, at step 410 it is determined whether any lanes have an RAW hazard, and if so the process proceeds to step 420. However, if no lanes have an RAW hazard, then at step 415 it is determined that no replay is required. The process can then proceed to the next instruction following the SV end instruction.

Figure 8:
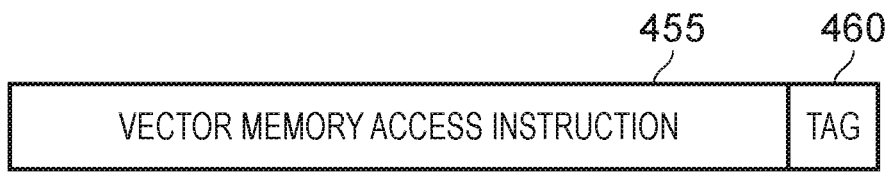
FIG. 8 illustrates how tag information may be associated with a vector memory access instruction in accordance with one example arrangement.

In one example implementation, all vector memory access instructions appearing between the SV start and the SV end instruction are considered to be speculative vector memory access instructions, and hence are monitored by the checking circuitry. However, in an alternative implementation the vector memory access instructions may be tagged to distinguish between those vector memory access instructions that are speculative vector memory access instructions and hence should be monitored by the checking circuitry, and those vector memory access instructions for which it is known that no inter lane memory hazards will occur and hence which can be ignored by the checking circuitry, for the purposes of considering horizontal memory hazards. This is illustrated schematically in FIG. 8, where the vector memory access instruction 455 has an associated tag 460.

The tag information can take a variety of forms. For example, as a first option it may be a single bit value, where for example a set state indicates that a check should be performed and a clear state indicates that no check for horizontal memory hazards is required. However, if desired as an alternative option the tag may be a multi-bit field, which allows vector memory access instructions to be grouped for checking. By using the tag information to identify different groups, then within a particular group each speculative vector memory access instruction may be checked with respect to each other speculative vector memory access instruction in that group, but there is no need to perform any checking for those instructions with respect to vector memory access instructions in another group. Hence, by using such tagging information, it is possible to reduce the amount of checking required in order to determine the presence or absence of horizontal memory hazards. This may potentially enable larger loops to be vectorised, because the address information for any "no-check" instructions does not need to be recorded within the tracking storage at runtime.

Figure 9:
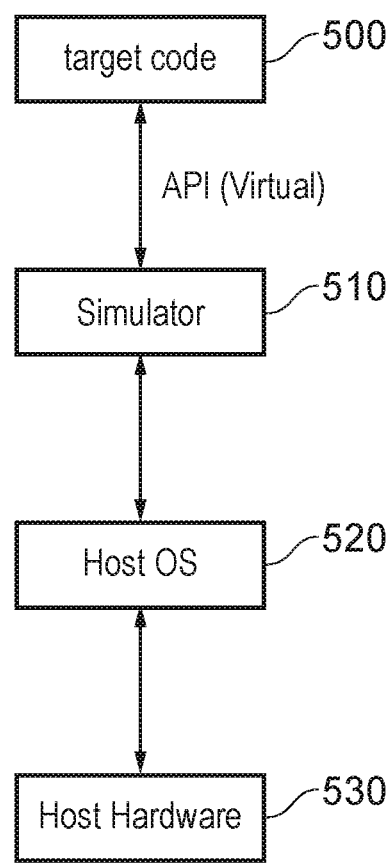
FIG. 9 illustrates a simulator implementation that may be utilised in one example arrangement.

FIG. 9 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 530, optionally running a host operating system 520, supporting the simulator program 510. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 530), some simulated embodiments may make use of the host hardware, where suitable.

The simulator program 510 may be stored on a computer-readable storage medium (which may be a non-transitory medium), and provides a program interface (instruction execution environment) to the target code 500 (which may include applications, operating systems and a hypervisor) which is the same as the application program interface of the hardware architecture being modelled by the simulator program 510. Thus, the program instructions of the target code 500, including the SV start and SV end instructions described above, may be executed from within the instruction execution environment using the simulator program 510, so that a host computer 530 which does not actually have the hardware features of the apparatus 2 discussed above can emulate these features.

From the above discussed examples, it will be appreciated that the techniques described herein increase the ability to vectorise scalar code, by allowing speculative vectorisation of code regions including multiple vector memory access instructions without determining prior to performing such vectorisation whether any TMDs may arise. Instead, a mechanism is provided that enables memory address conflicts to be detected in hardware during execution, and to then automatically trigger selective re-execution for only the specific lanes affected. This can lead to significant improvements in performance due to the ability to vectorise code that previously could not have been vectorised.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
 processing circuitry to execute program code, the program code including an identified code region comprising at least a plurality of speculative vector memory access instructions, where execution of each speculative vector memory access instruction is employed to perform speculative vectorisation of a series of scalar memory access operations using a plurality of lanes of processing;
 tracking storage to maintain, for each speculative vector memory access instruction, tracking information providing an indication of a memory address being accessed within each lane;
 checking circuitry to reference the tracking information during execution of the identified code region by the processing circuitry, in order to detect any inter lane memory hazard resulting from the execution of the plurality of speculative vector memory access instructions;
 a status storage element to maintain an indication of each lane for which the checking circuitry determines an inter lane memory hazard of at least a first type; and
 replay determination circuitry arranged, when an end of the identified code region is reached, to be responsive to the status storage element identifying at least one lane as having an inter lane memory hazard, to trigger re-execution of the identified code region for each lane identified by the status storage element; wherein
 the processing circuitry is arranged to perform out-of-order (OOO) processing of instructions;
 the apparatus comprises at least one OOO tracking structure having tracking entries to track memory hazards introduced by instruction reordering; and
 the tracking entries in the at least one OOO tracking structure are augmented such that the tracking storage useable by the checking circuitry to detect the inter lane memory hazards is incorporated within the at least one OOO trackikng structure, to allow the checking circuitry to detect, using the tracking entries in a given OOO trackikng structure, both:
 memory hazards introduced by instruction reordering; and
 the inter lane memory hazards that occur due to allocating the scalar memory access operations within the series to different lanes of processing.

2. The apparatus as claimed in claim 1, further comprising:
 a control storage element to store an inter lane dependency predicate referenced by the processing circuitry when executing the identified code region;
 wherein:

on an initial execution of the identified code region, the inter lane dependency predicate is initialised to identify all lanes as active so that execution of each speculative vector memory access instruction is unconstrained by the inter lane dependency predicate; and
 on a re-execution of the identified code region, the inter lane dependency predicate is set to constrain re-execution of the identified code region to the lanes identified in the status storage element.

3. The apparatus as claimed in claim 2, wherein:
 a start of the identified code region is identified by a speculative vectorisation (SV) start instruction;
 the processing circuitry is responsive to execution of the SV start instruction to record an address indication of a first instruction following the SV start instruction;
 the replay determination circuitry is responsive to determining a requirement to re-execute the identified code region to output the address indication of the first instruction to cause re-execution to begin from that first instruction; and
 the processing circuitry is further responsive to execution of the SV start instruction to initialise the inter lane dependency predicate.

4. The apparatus as claimed in claim 1, wherein:
 a start of the identified code region is identified by a speculative vectorisation (SV) start instruction;
 the processing circuitry is responsive to execution of the SV start instruction to record an address indication of a first instruction following the SV start instruction; and
 the replay determination circuitry is responsive to determining a requirement to re-execute the identified code region to output the address indication of the first instruction to cause re-execution to begin from that first instruction.

5. The apparatus as claimed in claim 1, wherein:
 an end of the identified code region is identified by a speculative vectorisation (SV) end instruction; and
 the processing circuitry is responsive to execution of the SV end instruction to cause the replay determination circuitry to determine whether re-execution of the identified code region is required for any lanes.

6. The apparatus as claimed in claim 1, wherein the speculative vector memory access instructions are introduced by a compiler seeking to speculatively vectorise scalar code, and the compiler is arranged to annotate the program code to identify the instructions forming the identified code region.

7. An apparatus as claimed in claim 1, wherein the identified code region forms at least part of a vector loop used to vectorise a scalar loop.

8. The apparatus as claimed in claim 1, wherein:
 the tracking information is arranged to further provide, for each speculative vector memory access instruction, a type indication to indicate whether that speculative vector memory access instruction is a speculative vector load instruction to load data from memory, or a speculative vector store instruction to store data to memory; and
 the checking circuitry is arranged to reference the type indication when determining whether an inter lane memory hazard has been detected.

9. The apparatus as claimed in claim 8, wherein the type indication is further arranged to identify whether the speculative vector memory access instruction is performing accesses to contiguous memory addresses or discontiguous memory addresses.

10. The apparatus as claimed in claim 1, wherein the tracking storage comprises a plurality of entries, wherein each entry that is associated with a speculative vector memory access instruction is used to store the tracking information for at least a subset of the scalar memory access operations performed by execution of that speculative vector memory access instruction.

11. The apparatus as claimed in claim 10, wherein each entry in the tracking storage is constrained to store tracking information for one or more memory addresses that are address-aligned to a given memory block granularity.

12. The apparatus as claimed in claim 10, wherein for each memory address identified within an entry in the tracking storage, the tracking information maintained in that entry is arranged to provide lane identification information sufficient to determine the lane to which each memory address relates.

13. The apparatus as claimed in claim 11, wherein for a speculative vector memory access instruction used to perform accesses to contiguous memory addresses, more than one entry in the tracking storage is allocated to store the associated tracking information when the contiguous memory addresses cross multiple address-aligned memory blocks.

14. The apparatus as claimed in claim 11, wherein for a speculative vector memory access instruction used to perform accesses to discontiguous memory addresses, a separate entry in the tracking storage is allocated to store the associated tracking information for each memory address accessed.

15. The apparatus as claimed in claim 1, wherein:
each speculative vector memory access instruction is a speculative vector load instruction to load data from memory, or a speculative vector store instruction to store data to memory;
the plurality of lanes of processing extend from a lowest lane associated with a first scalar memory access operation in the series being speculatively vectorised by the speculative vector memory access instruction, to a highest lane associated within a final scalar memory access operation in the series;
the checking circuitry is arranged to detect one or more of the following inter lane memory hazards:
a read after write (RAW) inter lane memory hazard where a given address is used in both a higher lane for a speculative vector load instruction and a lower lane for a speculative vector store instruction that appears after the speculative vector load instruction in original program order;
a write after read (WAR) inter lane memory hazard where a given address is used in both a higher lane for a speculative vector store instruction and a lower lane for a speculative vector load instruction that appears after the speculative vector store instruction in original program order;
a write after write (WAW) inter lane memory hazard where a given address is used in both a higher lane for a first speculative vector store instruction and a lower lane for a second speculative vector store instruction.

16. The apparatus as claimed in claim 15, further comprising:
a store buffer to temporarily store write data generated by execution of each speculative vector store instruction, wherein the write data for a given speculative vector store instruction is inhibited from being output from the store buffer to memory until any inter lane memory hazard resulting from the execution of the given speculative vector store instruction has been resolved.

17. The apparatus as claimed in claim 16, wherein:
when the checking circuitry detects presence of a WAR inter lane memory hazard, the checking circuitry is arranged to resolve the WAR inter lane memory hazard by causing the processing circuitry, when executing the speculative vector load instruction, to retrieve from memory, instead of from the store buffer, the data for the given address associated with the lower lane; and
the status storage element is not updated in response to identified WAR inter lane memory hazards.

18. The apparatus as claimed in claim 16, wherein the status storage element is updated in response to at least each RAW inter lane memory hazard detected by the checking circuitry, and the lane identified in the status storage element is the higher lane for the speculative vector load instruction.

19. The apparatus as claimed in claim 18, wherein the status storage element is further updated in response to each WAW inter lane memory hazard detected by the checking circuitry, and the lane identified in the status storage element is the higher lane for the first speculative vector store instruction.

20. The apparatus as claimed in claim 16, wherein:
when the checking circuitry detects presence of a WAW inter lane memory hazard, the checking circuitry is arranged to resolve the WAW inter lane memory hazard by causing the store buffer to be marked such that the write data produced in the lower lane during execution of the second speculative vector store instruction is inhibited from being output to memory; and
the status storage element is not updated in response to identified WAW inter lane memory hazards.

21. The apparatus as claimed in claim 1, wherein:
the at least one OOO tracking structure comprises a store buffer to temporarily store write data produced by execution of store instructions until it is determined that the write data can be committed to memory; and
the store buffer is augmented to allow the tracking information to be maintained therein for speculative vector store instructions within the identified code region.

22. An apparatus as claimed in claim 1, wherein:
the at least one OOO tracking structure comprises a memory hazard buffer to track execution of memory access instructions issued out-of-order; and
the memory hazard buffer is augmented to allow the tracking information to be maintained therein for speculative vector load instructions within the identified code region.

23. The apparatus as claimed in claim 1, wherein each vector memory access instruction in the identified code region is assumed to be a speculative vector memory access instruction, such that the checking circuitry is arranged to check for inter lane memory hazards associated with execution of each vector memory access instruction in the identified code region.

24. The apparatus as claimed in claim 1, wherein:
the vector memory access instructions are tagged to distinguish between those vector memory access instructions that are speculative vector memory access instructions and hence should be monitored by the checking circuitry, and those vector memory access instructions for which it is known no inter lane memory hazards will occur and hence which can be ignored by the checking circuitry.

25. A method of speculatively vectorising program code, comprising:

employing processing circuitry to execute program code, the program code including an identified code region comprising at least a plurality of speculative vector memory access instructions, where execution of each speculative vector memory access instruction is employed to perform speculative vectorisation of a series of scalar memory access operations using a plurality of lanes of processing, wherein the processing circuitry is arranged to perform out-of-order (OOO) processing of instructions;

maintaining within tracking storage, for each speculative vector memory access instruction, tracking information providing an indication of a memory address being accessed within each lane;

employing checking circuitry to reference the tracking information during execution of the identified code region by the processing circuitry, in order to detect any inter lane memory hazard resulting from the execution of the plurality of speculative vector memory access instructions;

maintaining within at least one OOO tracking structure, tracking entries to track memory hazards introduced by instrustion reordering;

wherein the tracking entries in the at least one OOO tracking structure are augmented such that the tracking storage useable by the checking circuitry to detect the inter lane memory hazards is incorporated within the at least one OOO tracking structure, to allow the checking circuitry to detect, using the tracking entries in a given OOO tracking structure, both:

memory hazards introduced by instruction reordering; and the inter lane memory hazards that occur due to allocating the scalar memory access operations within the series to different lanes of processing;

maintaining within a status storage element an indication of each lane for which the checking circuitry determines an inter lane memory hazard of at least a first type; and when an end of the identified code region is reached, and the status storage element identifies at least one lane as having an inter lane memory hazard, triggering re-execution of the identified code region for each lane identified by the status storage element.

26. A non-transitory storage medium storing a computer program which, when executed, controls a host data processing apparatus to provide an instruction execution environment comprising:

processing program logic to execute program code, the program code including an identified code region comprising at least a plurality of speculative vector memory access instructions, where execution of each speculative vector memory access instruction is employed to perform speculative vectorisation of a series of scalar memory access operations using a plurality of lanes of processing;

a tracking data structure to maintain, for each speculative vector memory access instruction, tracking information providing an indication of a memory address being accessed within each lane;

checking program logic to reference the tracking information during execution of the identified code region by the processing program logic, in order to detect any inter lane memory hazard resulting from the execution of the plurality of speculative vector memory access instructions;

a status data structure to maintain an indication of each lane for which the checking program logic determines an inter lane memory hazard of at least a first type; and replay determination program logic arranged, when an end of the identified code region is reached, to be responsive to the status data structure identifying at least one lane as having an inter lane memory hazard, to trigger re-execution of the identified code region for each lane identified by the status data structure; wherein the processing program logic is arranged to perform out-of-order (OOO) processing of instructions;

the instructions execution environment comprises at least one OOO tracking structure having tracking entries to track memory hazards introduced by instruction reordering; and the tracking entries in the at least one OOO tracking structure are augmented such that the tracking data structure useable by the checking program logic to detect the inter lane memory hazards is incorporated within the at least one OOO tracking structure, to allow the checking program logic to detect, using the tracking entries in a given OOO tracking structure, both:

memory hazards introduced by instruction reordering; and the inter lane memory hazards that occur due to allocating the scalar memory access operations within the series to different lanes of processing.

* * * * *